United States Patent [19]

Reichert

[11] Patent Number: 4,582,304

[45] Date of Patent: Apr. 15, 1986

[54] GAS SPRING WITH PRESSURE LOSS SAFETY

[75] Inventor: Gerhard Reichert, Neuwied, Fed. Rep. of Germany

[73] Assignee: Gas Spring Company, Div. of Fichtel & Sachs Industries, Inc., Colmar, Pa.

[21] Appl. No.: 680,610

[22] Filed: Dec. 12, 1984

Related U.S. Application Data

[63] Continuation of Ser. No. 476,361, Mar. 17, 1983, abandoned.

[51] Int. Cl.$^4$ ............................. F16F 9/02; F16F 9/19; F01B 11/02
[52] U.S. Cl. ................................. 267/64.25; 267/127; 92/85 B; 92/143; 92/13.1; 92/13.6
[58] Field of Search ............ 92/134, 85 B, 143, 13.1, 92/13.6, 82; 267/64.11, 126, 127, 64.25; 188/314; 91/422, 222

[56] References Cited

U.S. PATENT DOCUMENTS

| | | | |
|---|---|---|---|
| 2,774,446 | 12/1956 | De Carbon | 267/64.11 |
| 3,444,830 | 5/1969 | Doetsch | 267/64.28 |
| 3,531,065 | 9/1970 | Brown | 92/134 |
| 3,762,514 | 10/1973 | Freitag | 188/300 |
| 4,309,026 | 1/1982 | Reuschenbach et al. | 267/121 |

FOREIGN PATENT DOCUMENTS

| | | | |
|---|---|---|---|
| 982643 | 6/1951 | France | 188/314 |
| 1158818 | 6/1958 | France | 188/314 |
| 1510916 | 9/1976 | United Kingdom | |

Primary Examiner—Robert E. Garrett
Assistant Examiner—M. Williamson
Attorney, Agent, or Firm—Brumbaugh, Graves, Donohue & Raymond

[57] ABSTRACT

A gas spring, having a collapse safety feature operable in the event of pressure loss, is provided, for use, for example, as a counterbalance for flaps or vertically adjustable structures. A movable partition is arranged between the piston and the head of the cylinder of the gas spring, and is exposed on one side to a closed gas chamber under pressure, while on the other side the gas volume effecting the extension force of the piston rod is present between the piston and the partition. In event of pressure loss in the gas volume on either side of the piston, the movable partition will meet the piston and act as a safety to prevent abrupt release or lowering of the object for which the gas spring is to serve as a counterbalance.

4 Claims, 2 Drawing Figures

GAS SPRING WITH PRESSURE LOSS SAFETY

This application is a continuation of application Ser. No. 476,361, filed on Mar. 17, 1983 and now abandoned.

BACKGROUND OF THE INVENTION

The invention relates to a gas spring having a safety device to prevent against collapse in the event of pressure loss, a volume of gas under pressure is present in a cylinder, and a piston is connected to a piston rod sliding in contact with the inside wall of the cylinder, while the piston rod is guided and sealed at the end of the cylinder where it emerges. The safety comprises a movable partition arranged in the interior of the cylinder and sealed against the inside wall of the cylinder.

Such gas springs are employed, for example, for counterbalancing purposes and to lift flaps, drawing boards and the like. It may happen that the gas spring will lose pressure in the course of time. If in such case the fixation of the drawing board is released, the gas spring pressure will not suffice to compensate the weight of the drawing board with drafting machine, and if the pressure drop is considerable, the drawing board will come down very suddenly. The user is likely to be taken unawares, and bodily harm may result.

To eliminate this hazard, DE-OS No. 2,540,402 discloses the arrangement of a brake, a movable partition being arranged in the gas spring cylinder and acted upon on one side by the internal spring pressure and on the other side by cup springs. Towards the inside of the gas spring, the partition is provided with a longitudinally slit cone, capable of wedging into an annular plate encircling the piston rod. If the pressure in the gas spring diminishes, the cup springs force the cone into the plate. This alters the inside diameter of the cone, so that it comes into locking contact with the piston rod. Such a brake requires an additional seal between partition and piston rod, which is costly and lessens the ease of operation. In addition, the brake acts on the precision-machined piston rod, and there is a danger that the engagement of the cone and the piston rod may damage the latter. Another disadvantage is that the brake release is delayed if the pressure in the spring is increased by supplying gas. Then the unpredictably extended piston rod involves the same safety hazard as the unpredictable descent of the drawing board or flap.

SUMMARY OF THE INVENTION

The object of the invention, therefore, is to provide a gas spring with a collapse safety of simple structure and high dependability.

This object is accomplished, according to the invention, in that a movable partition is arranged between the piston and the head of the cylinder, and is exposed to gas chambers under pressure on both sides. When the pressures in the chambers are equal or approximately so, the extension force of the spring is the pressure prevailing in the zone of the piston rod times the piston rod area. If the pressure in the gas chamber parted by the piston is lowered because of a leak, the partition will move towards the piston until pressure equalization is restored. Upon retraction of the piston rod into the cylinder, the piston will thus come into contact with the partition, so that upon further retraction of the piston rod the extension force is increased sharply by the additional support of the partition. In this way, a very simple collapse safety is provided with a single part, and a high dependability of the gas spring is assured.

To povide a predetermined volume for the gas chamber between the head of the cylinder and the partition, according to one feature of the invention a stop is provided to limit the travel of the partition towards the head. This stop, according to the invention, is located on the inside wall of the cylinder and comprises a plurality of projections directed radially inward and distributed over the circumference.

According to another feature of the invention, a gas spring with collapse safety that is quite compact in axial direction is readily obtained in that the gas chamber arranged between the partition and the head of the cyclinder communicates by way of orifices in the wall of the cylinder near the head with a gas chamber formed by the outer wall of the cylinder and the inner wall of the jacket.

The equalization of pressure, when the gas spring is filled, between the gas chamber parted by the piston and the gas chamber between the partition and the head of the cylinder, is achieved in a simple way in that a spring-loaded check valve is arranged, according to the invention, in the partition, opening into the gas chamber between the partition and the head of the cylinder.

BRIEF DESRIPTION OF THE DRAWINGS

The invention will now be described with reference to the embodiments shown by way of example in the drawing, where FIG. 1 is a longitudinal cross section of a single-tube type gas spring incorporating the collapse safety device of the present invention; and FIG. 2 is a longitudinal cross section of a jacketed-type gas spring incorporating the collapse-safety device of the present invention.

DETAILED DESCRIPTION OF THE DRAWINGS

Figure 1:
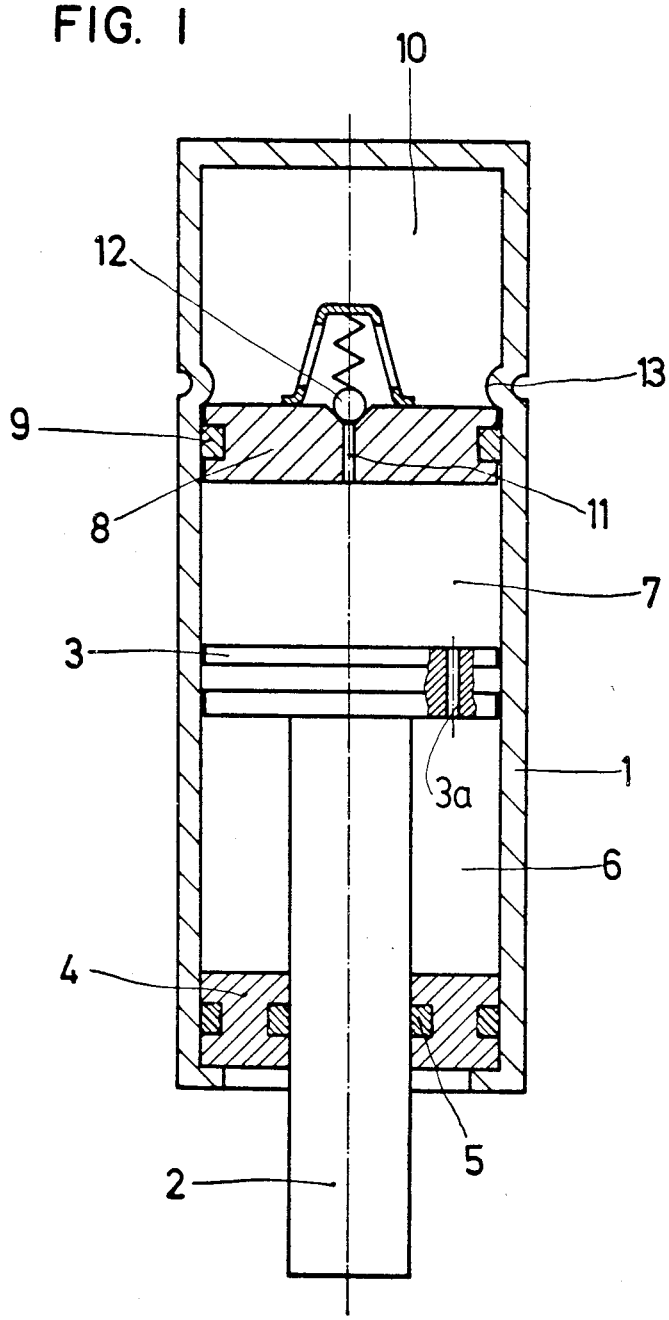

The gas spring of FIG. 1 comprises a cylinder 1 in which, connected to the piston rod 2, a piston 3 slides axially movable with a seal against the inside wall of the cylinder. To damp the travel of the piston, it is provided with a damping means, comprising a through hole 3a in the schematic illustration shown. At the end of the cylinder 1 where the piston rod emerges, a piston rod bearing 4 and seal 5 are provided. The piston 3 forms gas chamber 7 bounded by a movable partition 8 inside the cylinder, and the said chamber 7 communicates with the gas chamber 6 surrounding the piston rod 2 by way of the damping means arranged in the piston 3.

The movable partition 8 is sealed against the inside wall of the cylinder by a partition seal 9, and bounds the gas chamber 10 at the head end of the cylinder. The hole 11 in the partition 8 is closed by a spring-loaded check valve 12 opening towards the chamber 10. To ensure a minimum volume of the gas chamber 10, the movable partition 8 is limited in its travel by a plurality of projections 13 distributed over the circumference and acting as stops for the partition.

The gas chamber 10 is filled by way of chambers 6 and 7, chamber 10 being filled at the same time by way of the hole 11 in the movable partition 8 and the check valve 12. Owing to the light spring action of the check valve 12, the pressure in chamber 10 is somewhat less than that in chamber 7. This ensures that in normal operation of the gas spring, the movable partition 8 will be held against the projections 13 by the slight excess pressure in chamber 7.

If gas is lost, for example by way of the piston rod seal 5, the gas pressure in chambers 6 and 7 will decrease, diminishing the extension force of the piston rod (which is equal to the pressure times the cross sectional area of the piston rod). At the same time, the movable partition 8 will be displaced towards the piston until equality of pressure between chamber 10 and chambers 6 and 7 once more prevails. If the pressure in chambers 6 and 7 has dropped so far that the movable partition 8 enters the zone of the working stroke of the piston 3, the extension and retraction force of the piston rod 2 will rise sharply in the zone where the partition 8 meets the piston 3. A retraction of the piston rod 2, i.e., a closing of the flap or actuation of a vertical adjustment, is still possible, but with increased effort. The abnormal function of the system will be noticed, and the gas spring can be replaced.

In case of complete loss of pressure in chambers 6 and 7, the gas pressure in chamber 10 will force the partition 8 against the piston 3 immediately, to provide the force supporting the piston rod 2 throughout its stroke. The extension force acting on the piston rod 2 is now equal to the cross section of the partition 8 times the pressure in chamber 10, which decreases as the partition 8 moves on towards the piston rod bearing 4. Correspondingly, the extension and retraction force of the gas spring is now highly dependent on stroke, but substantially increased, and may be a multiple of the normal extension or retraction force, depending on the size of chamber 10 and the position of partition 8. Accordingly, the retraction of the piston rod on actuation of the flap or vertical adjustment now requires great expenditure of effort, and this abnormal condition calls for replacement of the gas spring.

Figure 2:
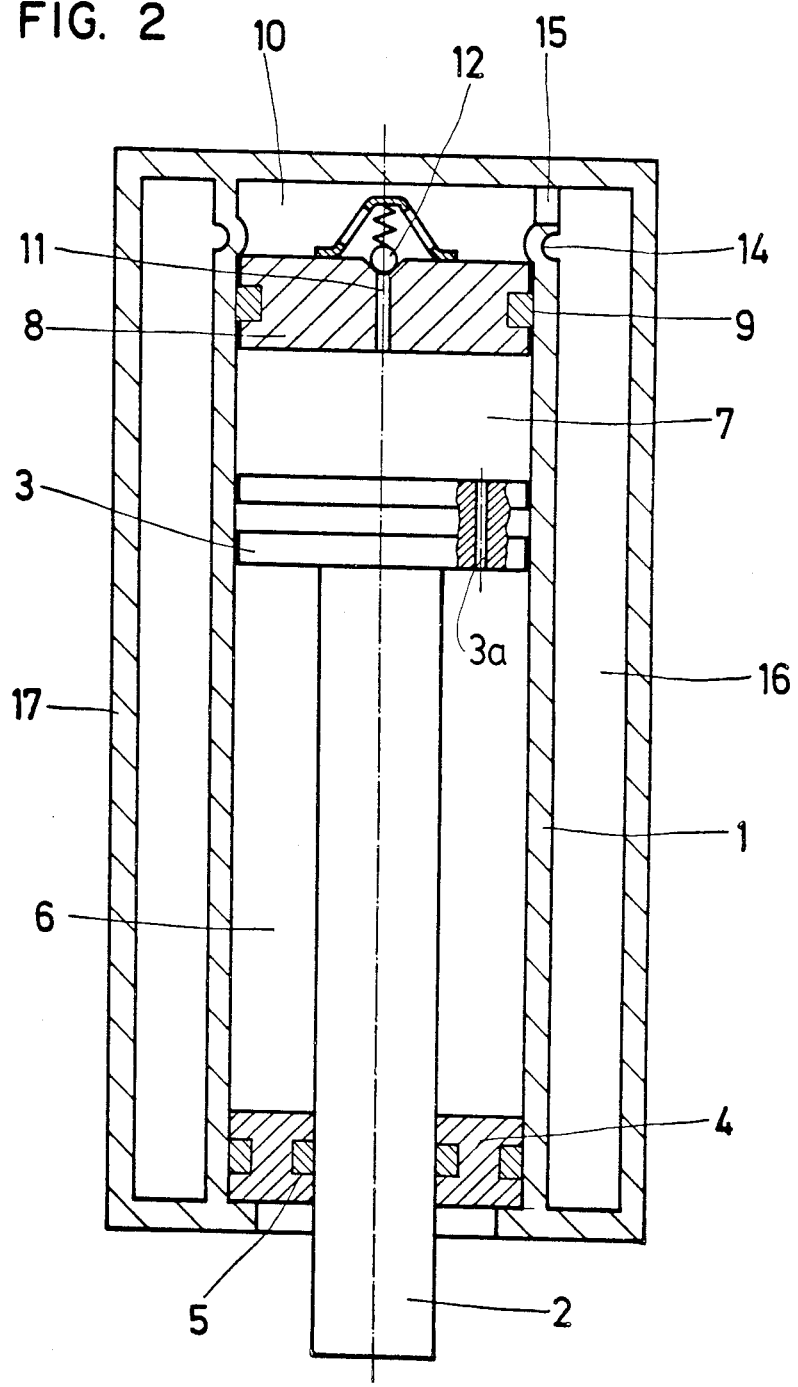

The embodiment of FIG. 2 differs from that of FIG. 1 essentially in that an additional gas chamber 16 communicates with chamber 10 by way of constantly open ports 15. This chamber 16 is annular and bounded firstly by the outside wall of cylinder 1 and secondly by the inside wall of a jacket 17. In this way, the movable partition 8 is acted upon on one side by a chamber of ample size, so that the thrust of the partition 8 will be sufficient even after a long travel. The stop for the partition 8 is here formed by an indentation in the cylinder 1, forming the projection 14. The reference numerals not mentioned here correspond to those in FIG. 1. The operation of this gas spring embodiment is likewise the same as of that in FIG. 1.

Instead of the check valve 12 in the movable partition 8, as indicated in the figures, the gas chamber 10 in FIG. 1 and chambers 10 and 16 in FIG. 2 may of course alternatively be filled through a separate valve. In that case, the movable partition requires no hole 11 or check valve 12.

I claim:
1. In a gas spring including a safety means to prevent collapse of said gas spring due to pressure loss, said gas spring comprising,
a cylinder member having an internal cylindrical face and two end walls defining a cavity within said cylinder member;
a piston rod extending axially through an aperture in one of said end walls and being axially movable with respect to said cylinder member;
a piston unit carried by said piston rod within said cylinder member and dividing said cavity into (1) a first working chamber located between said apertured end wall and said piston unit and (2) a second working chamber on the side of said piston unit opposite said apertured end wall, said piston unit including a flow passage for communication between said first and second working chambers to maintain substantially equal pressure in said first and second working chambers;
a first body of pressurized gas within said first and second working chambers; and
guiding and sealing means adjacent said aperture for sealingly guiding said piston rod within said aperture, the improvement wherein said safety means comprises:
a movable partition in said cylinder between said piston unit and the other of said end walls and sealed about its periphery against said internal cylindrical face of said cylinder to define a third chamber between said movable partition and said other end wall;
a second body of pressurized gas in said third chamber;
means defining a stop position of said partition relative to said other end wall so as to provide a predetermined volume of gas in said third chamber when said partition is at said stop position, said stop position being inwardly of said piston unit when said piston unit is at its axially innermost limit of travel within said cylinder;
the fill pressure of said first body of gas and the volumes of said first and second chambers, on the one hand, and the fill pressure of said second body of gas and the volume of said third chamber, on the other hand, being such that said partition (1) is initially urged to said stop position by the pressure of said first body of gas and remains out of contact with said piston unit during normal operation of said gas spring, (2) in the event of pressure loss in said first body of gas, is moved towards said piston unit by the pressure of said second body of gas to establish substantially equal pressure in both said first and second bodies of gas, and (3) in the event of a sufficient pressure loss in said first body of gas, is moved into engagement with said piston unit by the pressure of said second body of gas to resist inward movement of said piston rod; and
means for establishing, at least upon the initial filling of said first and second bodies of gas into said first and second chambers and said third chambers, respectively, a pressure differential across said partition such that said partition is initially urged to said stop position by the pressure of said first body of gas, said pressure-differential establishing means comprising (1) means defining a flow passage across said movable partition for admission of said second body of gas into said third chamber upon the filling of said first body of gas into said first and second chambers and (2) spring-loaded valve means associated with said flow passage for permitting gas flow therethrough from said second chamber to said third chamber only when the pressure of said first body of gas is sufficiently higher than the pressure of said second body of gas to overcome the spring-loading of said valve means, whereby said partition is automatically urged to said stop position upon the filling of said first and second bodies of gas into said cylinder and is initially re- tained at said stop position after filling by the pressure differential established across said partition.

2. The gas spring according to claim 1, further comprising a jacket surrounding said cylinder member and defining a fourth chamber bounded by the inner wall of said jacket and an outer wall of said cylinder member, said third chamber being in flow communication with said fourth chamber, whereby said second body of gas occupies both of said third and fourth chambers.

3. The gas spring according to claim 1, wherein said stop position defining means comprises means extending inwardly of said inner cylindrical face to limit the travel of said movable partition towards said other end wall.

4. The gas spring according to claim 3, wherein said inwardly extending means comprises a plurality of projections directed radially inwardly from said inner cylindrical face and distributed about its circumference.

* * * * *